Figure 1:
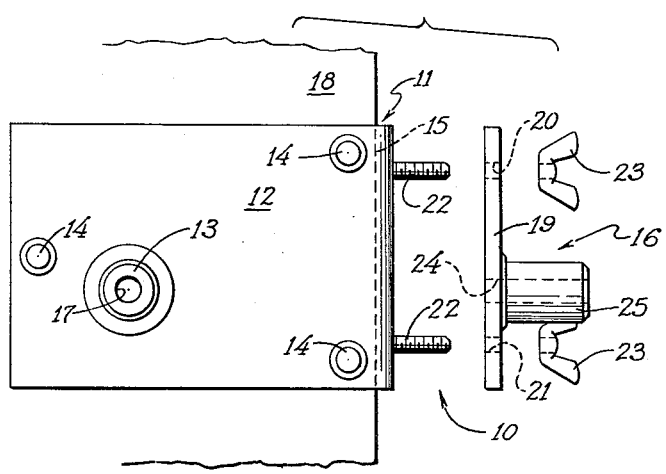

Nov. 14, 1961     B. A. MACKEY     3,008,359
APPARATUS FOR BORING A HOLE IN A
DESIRED DIRECTIONAL ALIGNMENT

Filed Feb. 25, 1959     2 Sheets-Sheet 1

INVENTOR.
BRUCE A. MACKEY

Nov. 14, 1961         B. A. MACKEY         3,008,359
APPARATUS FOR BORING A HOLE IN A
DESIRED DIRECTIONAL ALIGNMENT
Filed Feb. 25, 1959                 2 Sheets-Sheet 2

INVENTOR.
BRUCE A. MACKEY
BY
ATTY.

United States Patent Office 3,008,359
Patented Nov. 14, 1961

3,008,359
APPARATUS FOR BORING A HOLE IN A DESIRED DIRECTIONAL ALIGNMENT
Bruce A. Mackey, Libertyville, Ill., assignor to Time Saver Sales, Inc., Mundelein, Ill., a corporation of Illinois
Filed Feb. 25, 1959, Ser. No. 795,518
1 Claim. (Cl. 77—62)

This invention relates to an improved apparatus for boring a hole having a desired directional alignment with respect to a workpiece.

In woodworking operations it is often essential that a hole be bored having a substantially perfect directional alignment with respect to the workpiece. For example, the cylindrical housing for a door-lock mechanism must be bored in substantially perfect perpendicular alignment with respect to the door panels. A conventional method of assuring proper alignment is to guide the boring tool with an aligning jig. These jigs generally comprise a plate or frame body portion adapted for mounting on the workpiece and having a tubular guideway adapted to receive a tool of substantially equal diameter and maintain it in a desired directional alignment during the boring operation. Since it requires a relatively large tool to bore a hole big enough to receive and house a door-lock mechanism, a correspondingly large jig must be used, and relatively involved mounting means, such as clamps, are required to temporarily secure the jig to the workpiece. These jigs are relatively heavy and cumbersome and considerable time is consumed mounting and dismounting them.

In the apparatus of the present invention a relatively small light jig is used. This jig guides a relatively small drill in the drilling of a small hole having the desired directional alignment with respect to the workpiece. The jig is then removed and a small cylindrical pilot extending coaxially from a large rotatable boring tool is inserted into the small hole. The pilot engages within the hole so as to arrange the large boring tool in coaxial alignment with the small hole whereby a concentric hole of the desired size and having the desired directional alignment may be bored in the workpiece.

By guiding the large boring tool with the pilot and the small pilot hole in the manner described, the need for the heavy cumbersome jig is eliminated. Furthermore, since the jig used in the apparatus of the present invention is relatively light and small the time-consuming clamp mounting is not necessary. A plurality of small prongs extend through the jig plate and may be readily manually embedded into the workpiece to support the jig during the boring of the small pilot hole. Upon conclusion of the boring operation the jig is just as readily dismounted, resulting in an overall saving of time which becomes quite substantial in the course of a number of boring operations.

In addition, the prongs are spaced so as to leave markings corresponding to the mounting points for fasteners used to secure the object housed in the hole.

The boring tool developed for use in conjunction with the above described jig comprises a cylindrical pilot extending coaxially from the tool forwardly of the cutting head and having a diameter substantially the same as the pilot hole and the guideway in the jig.

The boring tool further comprises a detachable cutting blade for gouging out the interior of the concentric larger hole and a detachable peripheral cutting point for defining the larger hole's circumference. Because of the detachable nature of these elements, they may be removed for sharpening, and like elements may be substituted therefor in the interim.

Therefore, a primary object of this invention is to provide an improved apparatus for boring a hole having a desired directional alignment with respect to a workpiece.

Figure 2:
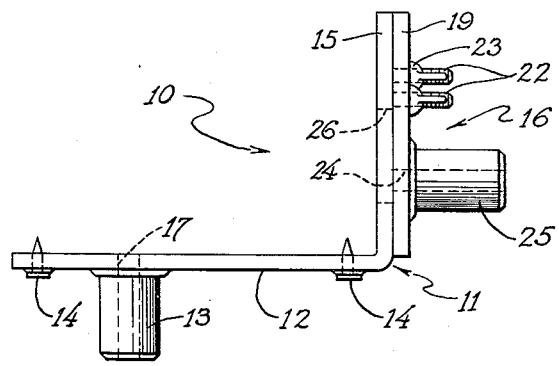
Figure 3:
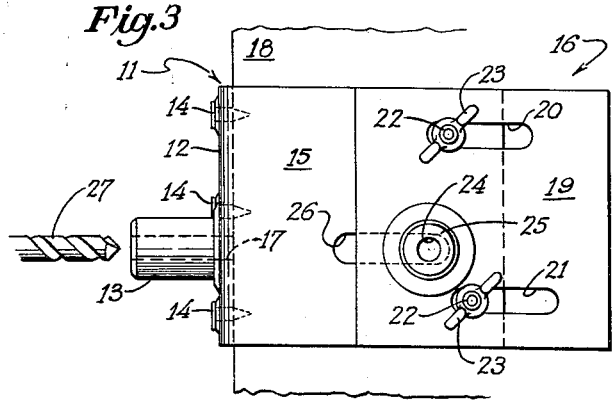
Figure 4:
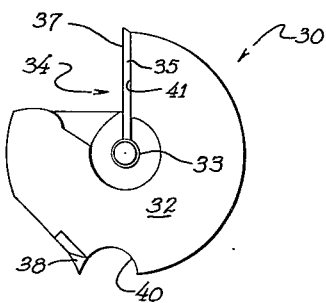
Figure 5:
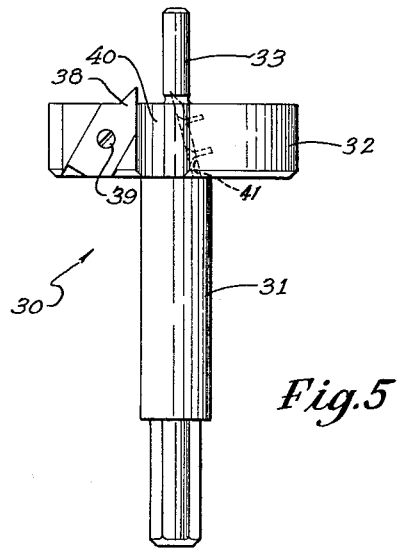
Figure 6:
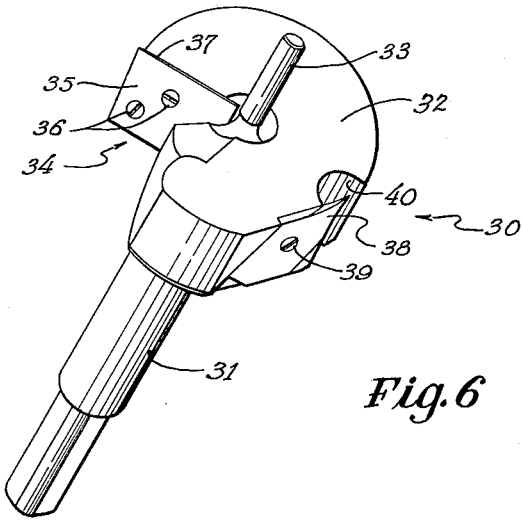

Other objects and advantages are inherent in the structure claimed and disclosed or will become apparent to those skilled in the art from the following detailed description in connection with the accompanying drawings wherein:

FIG. 1 is an exploded front elevational view of the drill jig mounted on the workpiece.
FIG. 2 is a top plan view of the jig.
FIG. 3 is a side elevational view of the jig mounted on the workpiece.
FIG. 4 is a top plan view of the boring tool used in conjunction with the aforementioned jig.
FIG. 5 is an elevational view of the boring tool.
FIG. 6 is a perspective view of the boring tool.

Referring to FIGS. 1, 2 and 3 the numeral 10 indicates generally a drill jig comprising a body portion 11 having a planar part 12 from which a cylindrical tubular guideway 13 and a plurality of mounting prongs 14 extend perpendicularly, the guideway and the prongs extending in opposite directions. A flange 15 extends perpendicularly from planar part 12 and an additional portion 16 is adjustably mounted for lateral movement along flange 15.

Planar part 12 constitutes a rectangular plate having an opening 17 in communication with tubular guideway 13. Prongs 14 removably mount body portion 11 on the workpiece 18 in the manner shown in FIGS. 1 and 3, with perpendicular flange 15 engaging a side of the workpiece so as to squarely align the jig therewith. A small drill 27 having a diameter substantially the same as the inner diameter of guideway 13 is then inserted through guideway 13, which directs drill 27 during the drilling operation so as to assure proper directional alignment of the resulting hole. During this operation jig 10 is supported on workpiece 18 solely by prongs 14. In the embodiment of the invention illustrated herein the guideway is adapted to direct the drilling of holes having a perpendicular alignment with respect to the workpiece. For holes having other directional alignments, a jig having a guideway extending therefrom at the angle of the desired alignment may be used.

If it is desired to bore an additional hole in the workpiece transverse to the aforementioned hole, then additional portion 16 is utilized. Portion 16 comprises a rectangular plate 19 having a pair of vertically spaced lateral slots 20, 21 each of which receives a threaded stud 22 projecting outwardly from flange 15 for adjustably mounting portion 16 for lateral movement along flange 15. A wing nut 23 is screwed onto each stud 22 and tightened to hold portion 16 in position. Extending outwardly from plate 19 and communicating with an opening 24 therein is a cylindrical tubular guideway 25 for receiving and directing a drill in the drilling of an additional aligned hole transverse to the first hole. Opening 24 is situated to communicate with a lateral slot 26 in flange 15 no matter the position to which portion 16 has been laterally adjusted.

Each hole drilled in the workpiece is adapted to receive a cylindrical pilot extending coaxially from a relatively large rotatable boring tool and to engage the pilot so as to maintain the larger tool in coaxial alignment with the small hole during the boring of a concentric larger hole. The larger hole is intended to house an object to be secured to the workpiece. Prongs 14 may be spaced with relation to guideway 13 so as to leave markings corresponding to the mounting points for fasteners used to secure the object housed in the recipient larger hole.

A preferred type of boring tool for use in conjunction with jig 10 is indicated generally in FIGS. 4, 5 and 6 by the numeral 30 and comprises a rotatable shaft 31 having a cutting head 32 mounted at one end thereof and a cylindrical pilot 33 extending coaxially therefrom through cutting head 32 and forwardly of the latter (upwardly in the figures).

Cutting head 32 is generally cylindrical in shape with a cut-away segment 34 having generally diverging sides radiating outwardly from pilot 33. Along an inclined side 41 of cut-away segment 34 a rectangular cutting blade 35 is detachably fastened with screws 36 so that its cutting edge 37 extends in a forwardly direction. A cutting point 38 is detachably fastened to the periphery of head 32 by a screw 39 and projects slightly forwardly of edge 37. Head 32 is cut away adjacent point 38 to form a small indent 40.

As previously indicated, cylindrical pilot 33 has a diameter substantially the same as both guideway 13 and the small pilot hole previously drilled in a desired directional alignment with respect to the workpiece. Pilot 33 is engaged within the pilot hole so as to arrange tool 30 in coaxial alignment with the small hole whereby a concentric larger hole may be bored. Cutting point 38 defines the periphery of the concentric larger hole, edge 37 gouges out the interior of the hole, and cut-away segment 34 and indent 40 provide egress for the resulting chips.

It is to be understood that the specific embodiment of the invention shown in the drawings and described above is merely illustrative of one of the many form which the invention may take in practice without departing from the scope of the invention as defined in the appended claim which is to be interpreted as broadly as possible in view of the prior art.

I claim:

A drill jig comprising a planar member, a drill guideway extending perpendicularly from said planar member, a flanged member extending perpendicularly from one end of said planar member in an opposite direction from said drill guideway, and prong means for mounting said planar member in a vertical disposition against the vertical wall surface of a workpiece with said flanged member abutting a portion of said workpiece which is perpendicular to said vertical wall surface, said prong mounting means consisting of three prongs extending perpendicularly from said planar member in the same direction as said flanged member extends, said prongs being disposed in a triangular relationship with two of said prongs in proximity to said one end of said planar member, the other one of said three prongs being disposed in proximity to the end opposite said one end of said planar member.

References Cited in the file of this patent

UNITED STATES PATENTS

| 55,144 | Moody | May 29, 1866 |
| 413,316 | Dobson | Oct. 22, 1889 |
| 1,103,069 | Montgomery | July 14, 1914 |
| 1,412,087 | Ottinger | Apr. 11, 1922 |
| 1,565,394 | Rafiner | Dec. 15, 1925 |
| 1,919,900 | Moller | July 25, 1933 |
| 2,887,776 | Eisner | May 26, 1959 |

FOREIGN PATENTS

| 212,876 | Great Britain | July 31, 1924 |